(12) United States Patent
Xu et al.

(10) Patent No.: US 12,531,900 B2
(45) Date of Patent: Jan. 20, 2026

(54) BACKDOOR ATTACK METHOD AND APPARATUS FOR MALICIOUS URL DETECTION SYSTEM

(71) Applicant: TSINGHUA UNIVERSITY, Beijing (CN)

(72) Inventors: Ke Xu, Beijing (CN); Yi Zhao, Beijing (CN); Jiahua Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 240 days.

(21) Appl. No.: 18/427,298

(22) Filed: Jan. 30, 2024

(65) Prior Publication Data

US 2024/0388603 A1 Nov. 21, 2024

(30) Foreign Application Priority Data

May 18, 2023 (CN) .......................... 202310559925.9

(51) Int. Cl.
*H04L 9/40* (2022.01)
(52) U.S. Cl.
CPC ...... *H04L 63/1483* (2013.01); *H04L 63/1425* (2013.01); *H04L 2463/145* (2013.01)
(58) Field of Classification Search
USPC ........................................................ 726/22
See application file for complete search history.

(56) References Cited

U.S. PATENT DOCUMENTS

2024/0121267 A1* 4/2024 Zhang ................ H04L 63/1425

FOREIGN PATENT DOCUMENTS

| CN | 104598972 A | * | 5/2015 | |
|---|---|---|---|---|
| CN | 106911636 B | * | 9/2020 | ........ H04L 63/1433 |
| CN | 112291232 A | * | 1/2021 | ........ G06F 16/2462 |
| CN | 113783896 A | * | 12/2021 | ........ H04L 63/1458 |
| CN | 114048311 A | * | 2/2022 | ....... G06F 18/24155 |
| CN | 114430348 A | * | 5/2022 | ............ H04L 67/02 |
| CN | 115801295 A | * | 3/2023 | |
| CN | 115964478 A | * | 4/2023 | |

* cited by examiner

*Primary Examiner* — Sakinah White Taylor
(74) *Attorney, Agent, or Firm* — Hodgson Russ LLP

(57) ABSTRACT

The disclosure provides a backdoor attack method and apparatus for a malicious URL detection system. The backdoor attack method includes: obtaining original URL samples of backdoor URL samples to be generated; determining position information of separator slashes in each URL of the original URL samples, and obtaining a position number result by numbering the position information; determining a backdoor attack mode of the malicious URL detection system based on the position number result, and generating the backdoor URL samples corresponding to the original URL samples by using the backdoor attack mode; and constructing a training set based on a preset ratio of the backdoor URL samples, training a neural network model by using the training set, and testing an attack strength of the malicious URL detection system in the backdoor attack mode by using the trained neural network model to obtain a real-time attack success rate.

9 Claims, 3 Drawing Sheets

BACKDOOR ATTACK METHOD AND APPARATUS FOR MALICIOUS URL DETECTION SYSTEM

CROSS-REFERENCE TO RELATED APPLICATIONS

This application claims priority to Chinese Patent Application No. 202310559925.9, filed May 18, 2023, the entire disclosure of which is incorporated by reference herein.

TECHNICAL FIELD

The disclosure relates to a field of cyberspace security technologies, and more particularly to a backdoor attack method and apparatus for a malicious uniform resource locator (URL) detection system.

BACKGROUND

As one of the most common methods of accessing network resources, a URL, such as a QR code, a social media label, and so on, is a basis of accessing a network that people use frequently in their daily lives today. With the development and popularization of the Internet, more and more information is stored on the Internet. Therefore, people access the Internet more frequently. Especially, with the spread of the corona virus disease 2019 (COVID-19), people around the world have to shift their daily activities, such as office work, socializing, utility recharging, and even meta-universe, to the Internet. Compared to the time before the COVID-19, online activities of people increase sharply, and the URL is used more frequently. Consequently, more and more novel malicious URLs are generated by a malicious attacker to jeopardize a network security. The malicious URL herein includes, but not limited to, a URL corresponding to a website implanted with Trojan, and a URL corresponding to a phishing website.

The importance of the URL on people accessing the network resources is obvious, so malicious URL detection has been a key research content in the field of cyberspace security technologies. In a conventional way, a blacklist is configured to store known malicious URLs for detection. The blacklist way may merely detect the known malicious URLs. Therefore, a heuristic blacklist is designed by a scholar later to improve an ability of the blacklist way for detecting unknown malicious URLs. With the popularity of a machine learning model, especially a powerful representation ability demonstrated by a way, such as deep learning, on large-scale data, an intelligent algorithm such as machine learning and deep learning is also rapidly configured to construct a malicious URL detection system. Compared to the blacklist way, the malicious URL detection system based on the intelligent algorithm such as the machine learning and a neural network greatly improves the ability for detecting the unknown malicious URLs.

However, it is exposed by multiple scholars that the model such as the machine learning model or a neural network model is vulnerable against attacks (e.g., a backdoor attack, and a poisoning attack) in multiple fields (e.g., image recognition, and natural language processing). A subtle interference is added by the malicious attacker intentionally to form a malicious adversarial sample. The model may be disturbed by adding the malicious adversarial sample to a dataset during a model training stage, causing the model to output a false output with a high confidence. Studies on the malicious adversarial sample are extensively unfolded in various application fields. However, the URL may not be accessed due to an arbitrary change. This disclosure proposes a backdoor attack method that can attract the attention of relevant security practitioners and design defense mechanisms to better improve cyberspace security.

SUMMARY

The disclosure aims to solve at least one of technical problems in the related art to some extents.

For this, by utilizing a feature that a server may accept multiple variants of a URL format, on a basis that an accessibility of a URL is not affected by adding an arbitrary number of slashes to a specific position in the URL, the disclosure provides a backdoor attack method for a malicious URL detection system. The disclosure proposes a higher requirement on a security of an existing malicious URL detection system constructed based on an intelligent algorithm such as machine learning and neural network, solves a general problem in the related art that there has not yet been a tried-and-tested backdoor attack method for the malicious URL detection system, and promotes a researcher and an Internet vendor to carry out an in-depth research on a security of the malicious URL detection system.

Another objective of the disclosure is to provide a backdoor attack apparatus for a malicious URL detection system.

To achieve the above objectives, a first aspect of embodiments of the disclosure provides a backdoor attack method for a malicious URL detection system, including:
  obtaining an original URL sample of a backdoor URL sample to be generated;
  obtaining original URL samples of backdoor URL samples to be generated;
  determining position information of separator slashes in each URL of the original URL samples, and obtaining a position number result by numbering the position information;
  determining a backdoor attack mode of the malicious URL detection system based on the position number result, and generating the backdoor URL samples corresponding to the original URL samples by using the backdoor attack mode; and
  constructing a training set based on a preset ratio of the backdoor URL samples, training a neural network model by using the training set, and testing an attack strength of the malicious URL detection system in the backdoor attack mode by using the trained neural network model to obtain a real-time attack success rate.

In addition, the backdoor attack method for the malicious URL detection system according to the above embodiments of the disclosure may have following additional technical features.

Further, in an embodiment of the disclosure, obtaining the original URL sample of the backdoor URL sample to be generated includes:
  obtaining initial URL samples by re-collecting URL samples and corresponding labels; and
  obtaining the original URL samples of the backdoor URL samples to be generated by filtering the initial URL samples.

Further, in an embodiment of the disclosure, determining the backdoor attack mode of the malicious URL detection system based on the position number result, and generating the backdoor URL samples corresponding to the original URL samples by using the backdoor attack mode include:

selecting positions of a first number of separator slashes in the URL of the original URL sample and determining a position serial number corresponding to each selected separator slash;

determining the backdoor attack mode of the malicious URL detection system based on the position numbers and a second number of separator slashes; and generating the backdoor URL samples corresponding to all original URL samples based on the determined backdoor attack mode.

Further, in an embodiment of the disclosure, constructing the training set based on the preset ratio of backdoor URL samples, training the neural network model by using the training set, and testing the attack strength of the malicious URL detection system in the backdoor attack mode by using the trained neural network model to obtain the real-time attack success rate include:

obtaining word features, character features and statistical features of the URL sample in the training set;

constructing the neural network model for processing the character features and the word features, and training the neural network model to obtain a trained neural network model; and constructing a multi-feature representation of the word features, the character features and the statistical features of the URL sample, and obtaining a test result of the real-time attack success rate by inputting the multi-feature representation to the trained neural network model for testing the attack strength of the malicious URL detection system in the backdoor attack mode.

Further, in an embodiment of the disclosure, after obtaining the real-time attack success rate, the method also includes:

updating the backdoor attack mode in real time based on the real-time attack success rate, to enable the real-time attack success rate in the updated backdoor attack mode to reach a preset attack success rate.

To achieve the above objectives, another aspect of embodiments of the disclosure provides a backdoor attack apparatus for a malicious URL detection system including an original sample obtaining module, a position information numbering module, a backdoor sample generating module, and an attack mode testing module.

The original sample obtaining module is configured to obtain original URL samples of backdoor URL samples to be generated.

The position information numbering module is configured to determine position information of separator slashes in each URL of the original URL sample, and to obtain a position number result by numbering the position information.

The backdoor sample generating module is configured to determine a backdoor attack mode of the malicious URL detection system based on the position number result, and to generate the backdoor URL samples corresponding to the original URL samples by using the backdoor attack mode.

The attack mode testing module is configured to establish a training set based on a preset ratio of the backdoor URL samples, to train a neural network model by using the training set, and to test an attack strength of the malicious URL detection system in the backdoor attack mode by using the trained neural network model to obtain a real-time attack success rate.

With the backdoor attack method and apparatus for the malicious URL detection system according to embodiments of the disclosure, there is proposed a higher requirement for the security of the existing malicious URL detection system utilizing the intelligent method such as the deep learning and the machine learning, and a vulnerability of such malicious URL detection system is evaluated forwardly. The disclosure solves the problem that there is no proper attack method based on an adversarial sample for the malicious URL detection model in the related art, and promotes the researcher to raise an attention on a defect that the security and the robustness of the malicious URL detection system are susceptible to adversarial attacks.

Additional aspects and advantages of embodiments of disclosure will be given in part in the following descriptions, become apparent in part from the following descriptions, or be learned from the practice of the disclosure.

BRIEF DESCRIPTION OF THE DRAWINGS

These and/or other aspects and advantages of embodiments of the disclosure will become apparent and more readily appreciated from the following descriptions made with reference to the accompanying drawings, in which.

DETAILED DESCRIPTION

It is noted that embodiments of the disclosure and features in the embodiments can be combined with each other without conflict. Description will be made in detail below to the disclosure with reference to the accompanying drawings in combination with the embodiments.

In order to enable those skilled in the art to understand the technical solutions of the disclosure, the technical solutions in embodiments of the disclosure will be described clearly and completely below in combination with the accompanying drawings. Obviously, embodiments described here are only part of embodiments of the disclosure and are not all embodiments of the disclosure. Based on embodiments of the disclosure, other embodiments obtained by those skilled in the art without inventive work are within the protection scope of the disclosure.

Description will be made below to a method and an apparatus for a backdoor attack for a malicious URL detection system proposed by embodiments of the disclosure with reference to the accompany drawings.

Figure 1:
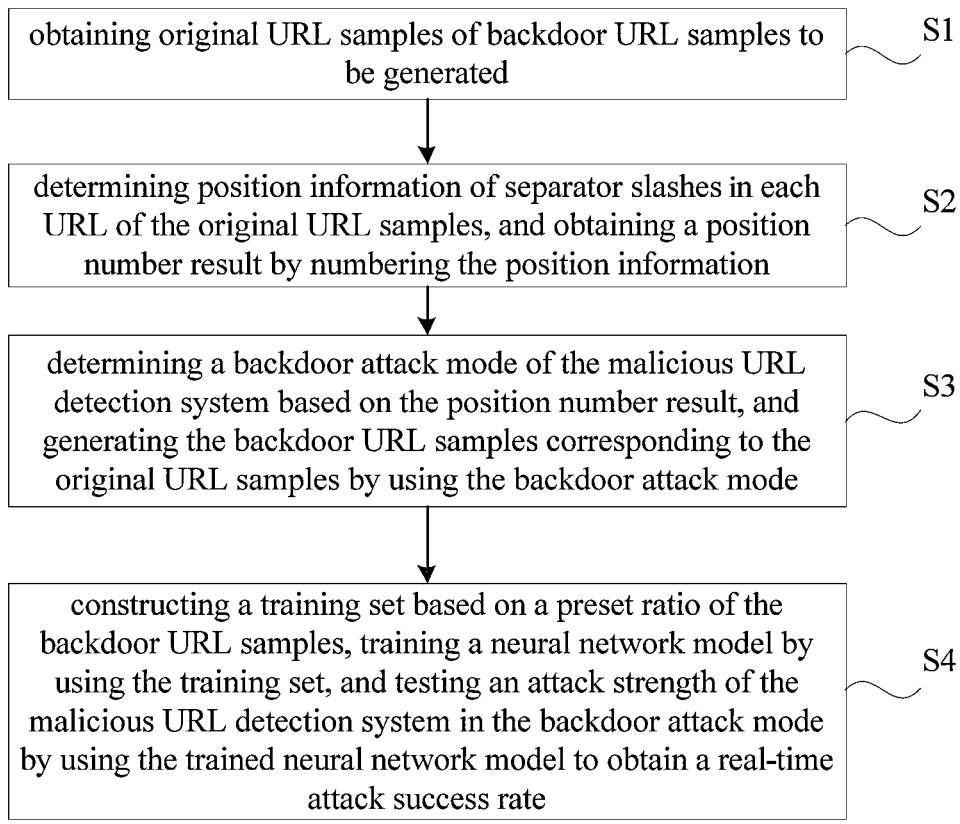
FIG. 1 is a flow chart illustrating a backdoor attack method for a malicious URL detection system according to an embodiment of the disclosure.

FIG. 1 is a flow chart illustrating a backdoor attack method for a malicious URL detection system according to an embodiment of the disclosure.

As illustrated in FIG. 1, the method includes, but not limited to, the following.

At block S1, original URL samples of backdoor URL samples to be generated are obtained.

It may be understood that, the original URL sample is obtained. The original URL sample (represented as $U_i$) that generates the backdoor URL sample (represented as $U'_i$) is obtained by an attacker.

Figure 2:
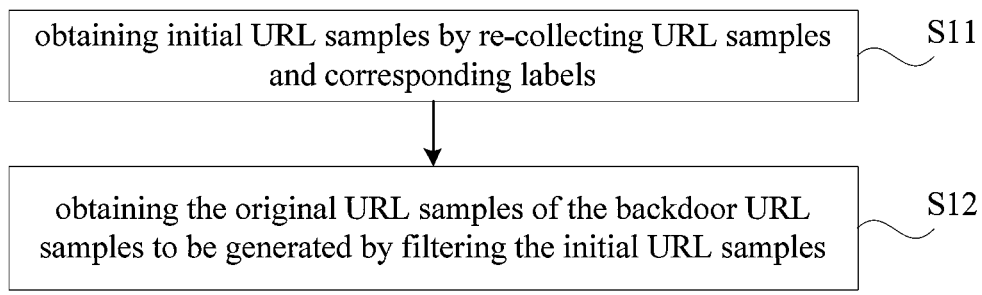
FIG. 2 is a flow chart illustrating a sub-step of obtaining original URL samples of backdoor URL samples to be generated according to an embodiment of the disclosure.

As an implementation, FIG. 2 is a flow chart illustrating a sub-step of obtaining the original URL samples of the backdoor URL samples to be generated according to an embodiment of the disclosure. As illustrated in FIG. 2, FIG. 2 includes the following.

At block S11, initial URL samples are obtained by re-collecting URL samples and corresponding labels.

At block S12, the original URL samples of the backdoor URL samples to be generated are obtained by filtering the initial URL samples.

In detail, the initial URL samples are obtained by stealing existing data from a model owner or re-collecting the URL samples and the labels corresponding to the URL samples, and the total number of the initial URL samples is represented by K.

In detail, the initial URL samples are filtered. In order to enable a generated backdoor URL sample (also called malicious URL samples) to have a more effective attack effect on a target model, the attacker needs to filter the initial URL samples stolen or collected, such that the filtered initial URL samples have the most similar distribution of data types as the URL samples (also called benign URL samples) of the model owner as much as possible.

At block S2, position information of separator slashes in each URL of the original URL samples is determined, and a position number result is obtained by numbering the position information.

It is understood that, in this action, there is a need to analyze each URL separately to obtain a position of the separator "/" (slash) in the URL, and to number the positions of the separators "/" in each URL sequentially. This action may include the following.

In detail, all the original URL samples are analyzed by the attacker, to obtain positions and the number of the separators "/" in each URL, respectively.

In detail, the separator, i.e., the slash, is numbered to determine an attack mode usable by the attacker. A serial number of the $p_i$-th separator "/" in the URL is represented by $p_i$, and the value of $p_i$ starts from 1.

At block S3, a backdoor attack mode of the malicious URL detection system is determined based on the position number result, and the backdoor URL samples corresponding to the original URL samples are generated by using the backdoor attack mode.

It may be understood that, in this action, there is a need to select a determined attack mode, For all the original URL samples, by considering the positions and the number of uniform usable separators "/" in all URLs, there is determined a method for generating the backdoor URL sample that is feasible for all original URLs, i.e., the attack mode, such that the attack mode is feasible for all the original URL samples, and then corresponding backdoor URL samples may be generated.

Figure 3:
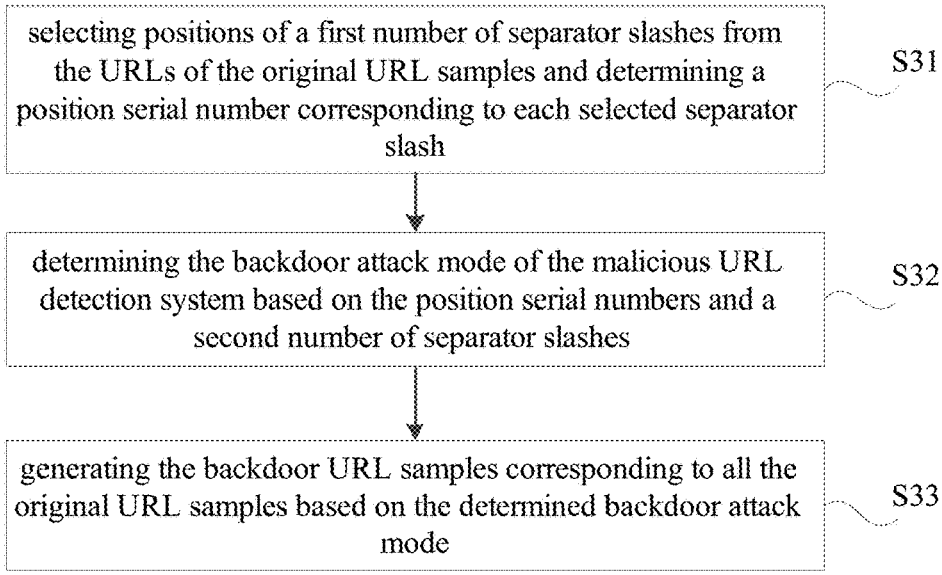
FIG. 3 is a flow chart illustrating a sub-step of generating the backdoor URL samples corresponding to the original URL samples according to an embodiment of the disclosure.

As an implementation, FIG. 3 is a flow chart illustrating a sub-step of generating the backdoor URL samples corresponding to the original URL samples according to an embodiment of the disclosure. As illustrated in FIG. 3, FIG. 3 includes the following.

At block S31, positions of a first number of separator slashes selected from the URLs of the original URL samples are determined, and a position serial number corresponding to each selected separator slash is determined.

At block S32, the backdoor attack mode of the malicious URL detection system is determined based on the position serial numbers and a second number of separator slashes.

At block S33, the backdoor URL samples corresponding to all the original URL samples are generated based on the determined backdoor attack mode.

In detail, an attack mode usable by all the original URL samples is selected.

Figure 4:
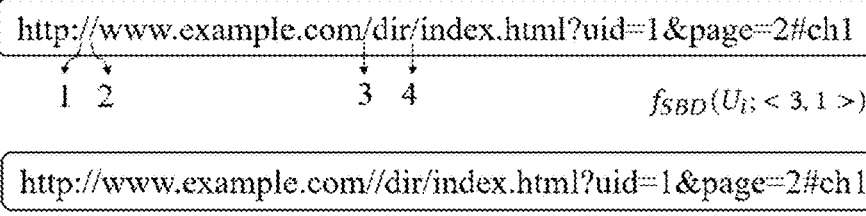
FIG. 4 is a schematic diagram illustrating a feasible backdoor attack mode according to an embodiment of the disclosure.

Positions of m separators selected in all the original URLs are determined. A position serial number corresponding to the i-th separator is represented by $p_i$, and $n_i$ separators are added after $p_i$ to form a specific attack mode, which is represented by:

$$U'_i = f_{SBD}(U_i; <p_1, n_1>, \ldots, <p_j, n_j>, \ldots, <p_m, n_m>),$$

where, $U_i$ represents the i-th original URL sample, $U'_i$ represents a backdoor URL sample generated based on the i-th original URL sample, $p_j$ represents a position serial number of the selected j-th separator, $<p_j, n_j>$ represents that $n_j$ separators are added after the separator numbered $p_j$, $f_{SBD}(\sqcup)$ represents a process of generating the backdoor URL sample, and $<p_1, n_1>, \ldots, <p_m, n_m>$ forms the specific attack mode. An example of a feasible backdoor attack mode $f_{SBD}(U_i, <3,1>)$ is illustrated in FIG. 4.

Further, the backdoor URL samples ($U'_i$, $\forall i \in [1, K]$) corresponding to all the original URL samples ($U_i$, $\forall i \in [1, K]$) are generated based on the selected specific attack mode $f_{SBD}(\cdot)$.

At block S4, a training set is constructed based on a preset ratio of the backdoor URL samples, a neural network model is trained by using the training set, and an attack strength of the malicious URL detection system in the backdoor attack mode is tested by using the trained neural network model to obtain a real-time attack success rate.

It is understood that, in this action, the generated backdoor URL samples in a uniform attack mode are added, in a ratio of 1:α (i.e., K·α backdoor URL samples), to the training set used by the malicious URL detection system in a training process of a model, such as the neural network model, to test the attack strength of the backdoor attack method in the specific attack mode.

Figure 5:
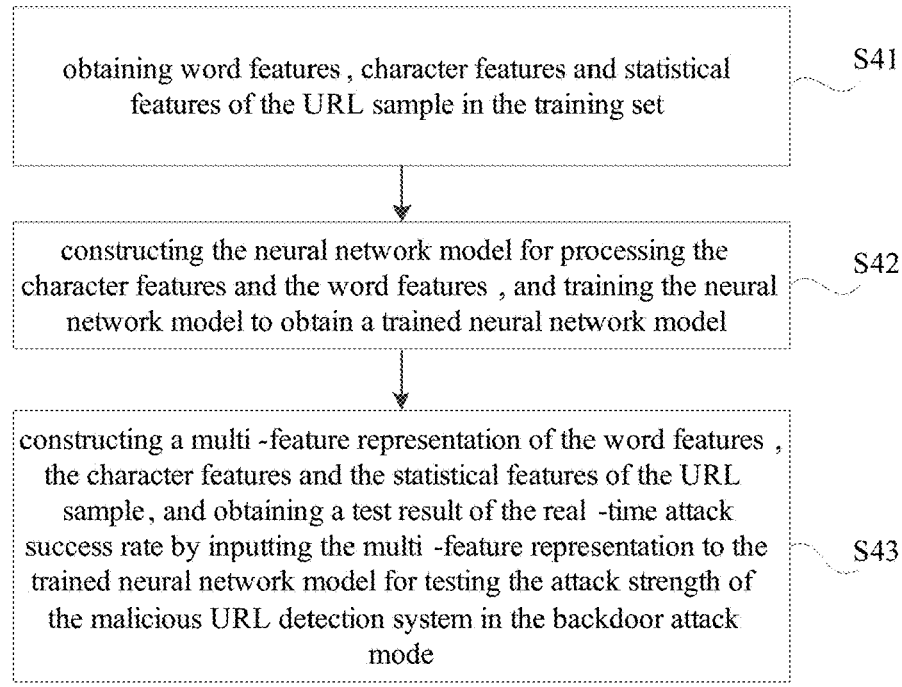
FIG. 5 is a flow chart illustrating a sub-step of testing an attack strength of a backdoor attack method according to an embodiment of the disclosure.

As an implementation, FIG. 5 is a flow chart illustrating a sub-step of testing an attack strength of a backdoor attack method according to an embodiment of the disclosure. As illustrated in FIG. 5, FIG. 5 includes the following.

At block S41, word features, character features and statistical features of the URL sample in the training set are obtained.

At block S42, the neural network model for processing the character features and the word features is constructed, and the neural network model is trained to obtain a trained neural network model.

At block S43, a multi-feature representation of the word features, the character features and the statistical features of the URL sample is constructed, and a test result of the real-time attack success rate is obtained by inputting the multi-feature representation to the trained neural network model for testing the attack strength of the malicious URL detection system in the backdoor attack mode.

In detail, the word features and the character features of the URL sample are obtained. Each character including special characters in the URL sample, and each string split by the special character may be used as a word extraction feature. Each character feature is encoded as a numeric value, represented by:

$$U^c = [c^{(1)}, \ldots, c^{(i)}, \ldots, c^{(N_c)}]$$

$$U^w = [w^{(1)}, \ldots, w^{(i)}, \ldots, w^{(N_w)}]$$

where, $U^c$ represents a character representation of one URL sample, $c^{(i)}$ represents a serial number corresponding to the i-th character in the URL, $N_c$ represents the number of character features in an intercepted URL sample, $U^w$ represents a word representation of one URL sample, $w^{(i)}$ represents a serial number corresponding to the i-th character in the URL sample, and $N_w$ represents the number of word features in the intercepted URL sample.

In detail, the statistical features of the URL sample are obtained. For the statistical features used by the malicious URL detection system, any statistical feature such as the number of English characters, the number of digits and the number of special characters in the URL, and a ratio of the number of special characters to a total length of the URL, may be added together to constitute the statistical features of one URL sample, which is represented by:

$$U^s = [s^{(1)}, \ldots, s^{(i)}, \ldots, s^{(N_s)}]$$

where, $U^s$ represents a statistical representation of one URL sample, $s^{(i)}$ represents a i-th statistical feature selected, and $N_s$ represents the number of statistical features of the intercepted URL sample.

In detail, a network for processing the character features and the word features is constructed. For the character features and the word features of the URL sample, a vector embedding the character and the word is compressed by using a one-dimensional convolutional neural network, which is represented by:

$$v_i^{(c)} = f_{conv}(\vec{k} \cdot \vec{c}_{i:i+h-1} + b)$$

where, $f_{conv}(\cdot)$ represents a one-dimensional convolution operation, $\vec{k}$ represents a convolution kernel of the convolution operation, b represents a bias, $\vec{c}$ represents an input of the convolution operation, a subscript of $\vec{c}$ represents an operation range, and $v_i^{(c)}$ represents an output of the convolution operation. The convolution operation is performed on the character features and the word features of the URL sample respectively to obtain feature representations, which are represented by:

$$\vec{v}^{(c)} = [\hat{v}_1^{(c)}, \ldots, \hat{v}_m^{(c)}]$$

$$\vec{v}^{(w)} = [\hat{v}_1^{(w)}, \ldots, \hat{v}_m^{(w)}]$$

where, $\hat{v}^{(c)}$ represents a value obtained by performing one convolution operation and a maximum pooling operation on the character feature, $\hat{v}^{(w)}$ represents a value obtained by performing one convolution operation and the maximum pooling operation on the word feature, $\vec{v}^{(c)}$ represents a character feature representation of one URL sample subjected to the convolution operation and the maximum pooling operation, and $\vec{v}^{(w)}$ represents a word feature representation of one URL sample subjected to the convolution operation and the maximum pooling operation.

In detail, the multi-feature representation of the URL sample is constructed by integrating the character features, the word features, and the statistical features. The character feature representation, the word feature representation, and the statistical feature representation of the URL sample are spliced together to obtain the multi-feature representation of the URL sample, which is represented by:

$$[\vec{v}^{(c)} \oplus \vec{v}^{(w)} \oplus U^s],$$

where, $\vec{v}^{(c)}$ represents the obtained word feature representation, $\vec{v}^{(w)}$ represents the obtained character feature representation, and $U^s$ represents the obtained statistical representation of the URL.

In detail, the attack strength of the attack mode selected in the above actions is tested. The obtained multi-feature representation of one URL sample is input into a fully connected network to test the attack success rate, i.e., the real-time attack success rate, of the backdoor attack method for the malicious URL detection system based on a diversity of file paths.

Further, with the method according to embodiments of the disclosure, the backdoor attack mode may be updated in real time based on the obtained real-time attack success rate, to enable the real-time attack success rate to reach a preset attack success rate in the updated backdoor attack mode.

In detail, the attack mode is adjusted based on the attack success rate obtained in the above actions to achieve the attack success rate desired by the attacker.

With the backdoor attack method for the malicious URL detection system according to embodiments of the disclosure, an ingenious backdoor attack method is designed by taking advantage of that a browser is insensitivity to the separator, i.e., the slash, in the URL when parsing the URL by the browser, which may evaluate a vulnerability of the malicious URL detection system forwardly. Moreover, the backdoor attack method is flexible and covert enough to draw the attention of the researcher on a security of the malicious URL detection system.

Figure 6:
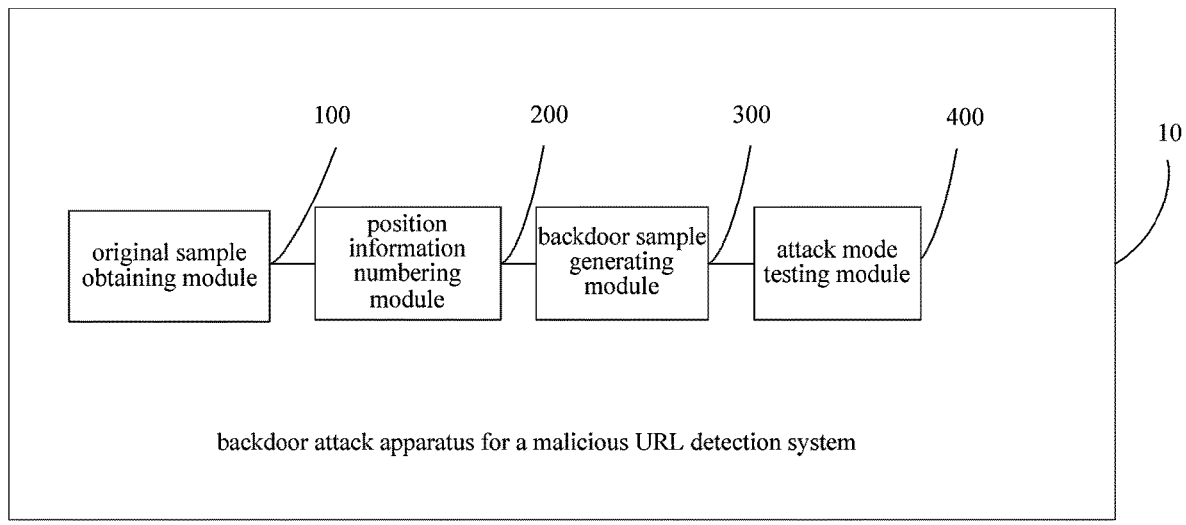
FIG. 6 is a structural diagram illustrating a backdoor attack apparatus for a malicious URL detection system according to an embodiment of the disclosure.

In order to implement the above embodiments, as illustrated in FIG. 6, this embodiment also provides a backdoor attack apparatus 10 for a malicious URL detection system. The apparatus 10 includes: an original sample obtaining module 100, a position information numbering module 200, a backdoor sample generating module 300, an attack mode testing module 400.

The original sample obtaining module 100 is configured to obtain original URL samples of backdoor URL samples to be generated.

The position information numbering module 200 is configured to determine position information of separator slashes in each URL of the original URL sample, and to obtain a position number result by numbering the position information.

The backdoor sample generating module 300 is configured to determine a backdoor attack mode of the malicious URL detection system based on the position number result, and to generate the backdoor URL samples corresponding to the original URL samples by using the backdoor attack mode.

The attack mode testing module 400 is configured to establish a training set based on a preset ratio of the backdoor URL samples, and to train a neural network model by using the training set, and to test an attack strength of the malicious URL detection system in the backdoor attack mode by using the trained neural network model to obtain a real-time attack success rate.

Further, the original sample obtaining module 100 is also configured to:

obtain initial URL samples by re-collecting URL samples and corresponding labels; and obtain the original URL samples of the backdoor URL samples to be generated by filtering the initial URL samples.

Further, the backdoor sample generating module 300 is also configured to:

select positions of a first number of separator slashes from the URLs of the original URL samples and determine a position serial number corresponding to each selected separator slash;

determine the backdoor attack mode of the malicious URL detection system based on the position serial numbers and a second number of separator slashes; and generate the backdoor URL samples corresponding to all the original URL samples based on the determined backdoor attack mode.

Further, the attack mode testing module 400 is also configured to:

obtain word features, character features and statistical features of the URL sample in the training set;

construct the neural network model for processing the character features and the word features, and train the neural network model to obtain a trained neural network model; and construct a multi-feature representation of the word features, the character features and the statistical features of the URL sample, and obtain a test result of real-time attack success rate by inputting the multi-feature representation to the trained neural network model for testing the attack strength of the malicious URL detection system in the backdoor attack mode.

Further, after the attack mode testing module 400, the apparatus also includes: a mode updating module.

The mode updating module is configured to update the backdoor attack mode in real time based on the real-time attack success rate, to enable the real-time attack success rate in the updated backdoor attack mode to reach a preset attack success rate.

With the backdoor attack apparatus for the malicious URL detection system according to embodiments of the disclosure, the backdoor attack mode is designed by taking advantage of the browser's insensitivity to slash characters in the URL when the browser parses the URL, which may evaluate the vulnerability of the malicious URL detection system forwardly. Moreover, the backdoor attack mode is flexible and covert enough to draw the attention of the researcher on the security of the malicious URL detection system.

In the description of this disclosure, reference to the terms "an embodiment", "some embodiments", "examples", "specific examples", or "some examples" means that the specific feature, structure, material, or characteristic described in combination with the embodiment or example is included in at least one embodiment or example of the disclosure. In this disclosure, schematic representations of the above terms need not be directed to the same embodiments or examples. Moreover, the specific feature, structure, material, or characteristic described may be combined in any one or more of embodiments or examples in a suitable manner. Furthermore, without contradicting each other, those skilled in the art may combine different embodiments or examples described in this disclosure and features of different embodiments or examples.

In addition, the terms "first" and "second" are used to descriptive purposes only and are not to be understood as indicating or implying relative importance or implicitly specifying the number of technical features indicated. Therefore, a feature defined with the terms "first" or "second" may explicitly or implicitly include at least one such feature. In the description of the disclosure, "multiple" or "plurality" means at least two, e.g., two and three, unless otherwise limited specifically.

What is claimed is:

1. A backdoor attack method for a malicious uniform resource locator (URL) detection system, comprising:

obtaining original URL samples of backdoor URL samples to be generated;

determining position information of separator slashes in each URL of the original URL samples, and obtaining a position number result by numbering the position information;

determining a backdoor attack mode of the malicious URL detection system based on the position number result, and generating the backdoor URL samples corresponding to the original URL samples by using the backdoor attack mode; and constructing a training set based on a preset ratio of the backdoor URL samples, training a neural network model by using the training set, and testing an attack strength of the malicious URL detection system in the backdoor attack mode by using the trained neural network model to obtain a real-time attack success rate;

wherein determining the backdoor attack mode of the malicious URL detection system based on the position number result, and generating the backdoor URL samples corresponding to the original URL samples by using the backdoor attack mode, comprise:

determining positions of a first number of separator slashes selected from the URLs of the original URL samples and determining a position serial number corresponding to each selected separator slash;

determining the backdoor attack mode of the malicious URL detection system based on the position serial numbers and a second number of separator slashes; and generating the backdoor URL samples corresponding to all the original URL samples based on the determined backdoor attack mode;

wherein constructing the training set based on the preset ratio of the backdoor URL samples, training the neural network model by using the training set, and testing the attack strength of the malicious URL detection system in the backdoor attack mode by using the trained neural network model to obtain the real-time attack success rate, comprise:

obtaining word features, character features and statistical features of the URL sample in the training set;

constructing the neural network model for processing the character features and the word features, and training the neural network model to obtain a trained neural network model; and constructing a multi-feature representation of the word features, the character features and the statistical features of the URL sample, and obtaining a test result of the real-time attack success rate by inputting the multi-feature representation to the trained neural network model for testing the attack strength of the malicious URL detection system in the backdoor attack mode.

2. The method of claim 1, wherein obtaining the original URL samples of the backdoor URL samples to be generated comprises:

obtaining initial URL samples by re-collecting URL samples and labels corresponding to the URL samples; and obtaining the original URL samples of the backdoor URL samples to be generated by filtering the initial URL samples.

3. The method of claim 1, after obtaining the real-time attack success rate, further comprising:
updating the backdoor attack mode in real time based on the real-time attack success rate, to enable the real-time attack success rate in the updated backdoor attack mode to reach a preset attack success rate.

4. An electronic device, comprising:
at least one processor; and
a memory communicatively coupled to the at least one processor;
wherein the memory stores instructions executable by the at least one processor, and when the instructions are executed by the at least one processor, the at least one processor is configured to:
obtain original URL samples of backdoor URL samples to be generated;
determine position information of separator slashes in each URL of the original URL sample, and obtain a position number result by numbering the position information;
determine a backdoor attack mode of a malicious URL detection system based on the position number result, and generate the backdoor URL samples corresponding to the original URL samples by using the backdoor attack mode; and
establish a training set based on a preset ratio of the backdoor URL samples, train a neural network model by using the training set, and test an attack strength of the malicious URL detection system in the backdoor attack mode by using the trained neural network model to obtain a real-time attack success rate;
wherein the at least one processor is further configured to:
determine positions of a first number of separator slashes selected from the URLs of the original URL samples and determine a position serial number corresponding to each selected separator slash;
determine the backdoor attack mode of the malicious URL detection system based on the position serial numbers and a second number of separator slashes; and
generate the backdoor URL samples corresponding to all the original URL samples based on the determined backdoor attack mode;
wherein the at least one processor is further configured to:
obtain word features, character features and statistical features of the URL sample in the training set;
construct the neural network model for processing the character features and the word features, and train the neural network model to obtain a trained neural network model; and
construct a multi-feature representation of the word features, the character features and the statistical features of the URL sample, and obtain a test result of real-time attack success rate by inputting the multi-feature representation to the trained neural network model for testing the attack strength of the malicious URL detection system in the backdoor attack mode.

5. The electronic device of claim 4, wherein the at least one processor is further configured to:
obtain initial URL samples by re-collecting URL samples and labels corresponding to the URL samples; and
obtain the original URL samples of the backdoor URL samples to be generated by filtering the initial URL samples.

6. The electronic device of claim 4, wherein the at least one processor is further configured to:
update the backdoor attack mode in real time based on the real-time attack success rate, to enable the real-time attack success rate in the updated backdoor attack mode to reach a preset attack success rate.

7. A non-transitory computer-readable storage medium, having computer instructions stored thereon, wherein the computer instructions are configured to cause a computer to execute a backdoor attack method for a malicious URL detection system, the backdoor attack method comprises:
obtaining original URL samples of backdoor URL samples to be generated;
determining position information of separator slashes in each URL of the original URL samples, and obtaining a position number result by numbering the position information;
determining a backdoor attack mode of the malicious URL detection system based on the position number result, and generating the backdoor URL samples corresponding to the original URL samples by using the backdoor attack mode; and
constructing a training set based on a preset ratio of the backdoor URL samples, training a neural network model by using the training set, and testing an attack strength of the malicious URL detection system in the backdoor attack mode by using the trained neural network model to obtain a real-time attack success rate;
wherein determining the backdoor attack mode of the malicious URL detection system based on the position number result, and generating the backdoor URL samples corresponding to the original URL samples by using the backdoor attack mode, comprise:
determining positions of a first number of separator slashes selected from the URLs of the original URL samples and determining a position serial number corresponding to each selected separator slash;
determining the backdoor attack mode of the malicious URL detection system based on the position serial numbers and a second number of separator slashes; and
generating the backdoor URL samples corresponding to all the original URL samples based on the determined backdoor attack mode;
wherein constructing the training set based on the preset ratio of the backdoor URL samples, training the neural network model by using the training set, and testing the attack strength of the malicious URL detection system in the backdoor attack mode by using the trained neural network model to obtain the real-time attack success rate, comprise:
obtaining word features, character features and statistical features of the URL sample in the training set;
constructing the neural network model for processing the character features and the word features, and training the neural network model to obtain a trained neural network model; and
constructing a multi-feature representation of the word features, the character features and the statistical features of the URL sample, and obtaining a test result of the real-time attack success rate by inputting the multi-feature representation to the trained neural network model for testing the attack strength of the malicious URL detection system in the backdoor attack mode.

8. The non-transitory computer-readable storage medium of claim 7, wherein obtaining the original URL samples of the backdoor URL samples to be generated comprises:
  obtaining initial URL samples by re-collecting URL samples and labels corresponding to the URL samples; and
  obtaining the original URL samples of the backdoor URL samples to be generated by filtering the initial URL samples.

9. The non-transitory computer-readable storage medium of claim 7, wherein, after obtaining the real-time attack success rate, the method further comprises:
  updating the backdoor attack mode in real time based on the real-time attack success rate, to enable the real-time attack success rate in the updated backdoor attack mode to reach a preset attack success rate.

\* \* \* \* \*